US012179842B2

(12) United States Patent
Schelén et al.

(10) Patent No.: US 12,179,842 B2
(45) Date of Patent: Dec. 31, 2024

(54) VEHICLE STRUCTURE

(71) Applicant: AUTOTECH ENGINEERING S.L., Bizkaia (ES)

(72) Inventors: Oscar Schelén, Piteå (SE); Robert Viklund, Luleå (SE); Mattias Lehto, Luleå (SE); Hans Bodin, Södra Sunderbyn (SE); Stefan Arvidsson, Piteå (SE)

(73) Assignee: AUTOTECH ENGINEERING S.L., Bizkaia (ES)

( * ) Notice: Subject to any disclaimer, the term of this patent is extended or adjusted under 35 U.S.C. 154(b) by 251 days.

(21) Appl. No.: 17/908,399

(22) PCT Filed: Feb. 8, 2021

(86) PCT No.: PCT/EP2021/052902
§ 371 (c)(1),
(2) Date: Aug. 31, 2022

(87) PCT Pub. No.: WO2021/180403
PCT Pub. Date: Sep. 16, 2021

(65) Prior Publication Data
US 2023/0347985 A1    Nov. 2, 2023

(30) Foreign Application Priority Data

Mar. 9, 2020  (SE) .................................. 2050263-9

(51) Int. Cl.
*B62D 25/02*  (2006.01)
*B62D 21/15*  (2006.01)
(Continued)

(52) U.S. Cl.
CPC ......... *B62D 25/025* (2013.01); *B62D 21/157* (2013.01); *B62D 25/04* (2013.01); *B62D 25/08* (2013.01); *B62D 25/2036* (2013.01)

(58) Field of Classification Search
CPC ...... B62D 25/025; B62D 25/04; B62D 25/08; B62D 25/2036; B62D 21/157; B62D 21/15
(Continued)

(56) References Cited

U.S. PATENT DOCUMENTS

| 4,840,424 A | * | 6/1989 | Asoh ..................... B62D 21/11 296/204 |
| 6,189,953 B1 | * | 2/2001 | Wycech ............... B62D 29/002 296/187.02 |

(Continued)

FOREIGN PATENT DOCUMENTS

| DE | 102014012082 A1 | 2/2016 |
| EP | 1331160 A1 | 7/2003 |

(Continued)

OTHER PUBLICATIONS

International Search Report and Written Opinion issued in PCT/EP2021/052902; mailed May 10, 2021.
Swedish Search Report issued in 2050263-9; mailed Oct. 9, 2020.

*Primary Examiner* — Dennis H Pedder
(74) *Attorney, Agent, or Firm* — Studebaker & Brackett PC

(57) ABSTRACT

A vehicle structure comprising a portion extending in a longitudinal direction, wherein the portion comprises a first member extending in the longitudinal direction and a second member extending in the longitudinal direction. The first member is con-figured to face an inside of a vehicle, and the second member is configured to face an outside of the vehicle. The first and second members are attached to one another to form a substantially closed space between them. The portion comprises a wave-shaped reinforcement member located in a substantially closed space. The substantially closed space is formed when the first and second members are attached to one another.

20 Claims, 13 Drawing Sheets

(51) Int. Cl.
*B62D 25/04* (2006.01)
*B62D 25/08* (2006.01)
*B62D 25/20* (2006.01)

(58) Field of Classification Search
USPC ............... 296/209, 30, 203.03, 204; 293/102
See application file for complete search history.

(56) References Cited

U.S. PATENT DOCUMENTS

| | | |
|---|---|---|
| 10,479,413 B1 | 11/2019 | Woods et al. |
| 2018/0237075 A1* | 8/2018 | Kawabe ................. B60L 50/66 |

FOREIGN PATENT DOCUMENTS

| | | | |
|---|---|---|---|
| EP | 2927101 A1 | 10/2015 | |
| FR | 3050165 A1 | 10/2017 | |
| JP | 2008-155700 A | 7/2008 | |
| JP | 2010-274848 A | 12/2010 | |
| WO | 2012/090042 A1 | 7/2012 | |
| WO | 2019/059821 A1 | 3/2019 | |
| WO | 2019/151084 A1 | 8/2019 | |

* cited by examiner

VEHICLE STRUCTURE

TECHNICAL FIELD

Aspects of the present invention relate to a vehicle structure including a portion extending in a longitudinal direction, wherein the portion comprises a first member extending in the longitudinal direction and a second member extending in the longitudinal direction. The first member is configured to face an inside of a vehicle, and the second member is configured to face an outside of the vehicle. The first and second members are attached to one another to form a substantially closed space.

BACKGROUND OF THE INVENTION

In the design of a frame portion of a motor vehicle, there is a compromise between weight and strength. An advantageous manner of obtaining a good compromise is to produce a frame portion from one or more metal plates or metal alloy plates formed into a requested shape, e.g. a hat profile.

In general, a frame portion of a motor vehicle is formed to have a certain rigidity since it may receive various impacts from the outside. At the same time, some frame portions should allow deformation for absorbing impacts when receiving an overload, e.g. due to a collision with an external object, e.g. another vehicle or a stationary object, e.g. a tree etc. One example of a vehicle frame portion that should be allowed to deform for absorbing impacts while being rigid is the vehicle side sill structure.

SUMMARY OF THE INVENTION

The inventors of the present invention have found that a vehicle structure can be further improved.

An object of the embodiments of the present invention is thus to improve a vehicle structure.

The above-mentioned object and further objects are attained by providing a vehicle structure comprising a portion, wherein the portion extends in a longitudinal direction, wherein the portion comprises a first member extending in the longitudinal direction, and
a second member extending in the longitudinal direction,
wherein the first member is configured to face an inside of a vehicle,
wherein the second member is configured to face an outside of the vehicle,
wherein each of the first and second members has a compartment extending in the longitudinal direction, each compartment having a bottom surface configured to face one of the inside and outside of the vehicle,
wherein the first and second members are attached to one another such that the compartments and the first and second members form a substantially closed space,
wherein the portion comprises one or more reinforcement members located in the substantially closed space, the reinforcement member extending in the longitudinal direction,
wherein the reinforcement member has a first leg extending in a direction transverse to the longitudinal direction,
wherein the reinforcement member has a second leg extending in a direction transverse to the longitudinal direction,
wherein each leg has a foot extending in the longitudinal direction,
wherein the foot of the first leg and the foot of the second leg are spaced apart from one another,
wherein the first and second legs are joined in a head section,
wherein the first leg is located between the second leg and the bottom surface of the compartment of one of the first and second members while the second leg is located between the first leg and the bottom surface of the compartment of the other one of the first and second members,
wherein the head section is corrugated and comprises corrugations,
wherein the corrugations comprise ridges and grooves,
wherein each ridge extends between the first leg and the second leg, and
wherein each groove extends between the first leg and the second leg.

An advantage of the innovative reinforcement member of the vehicle structure is that an advantageous deformation of the vehicle structure for absorbing impacts is provided while maintaining or improving the rigidity and reinforcement of the vehicle structure in order to prevent penetration upon lateral or side collisions. By means of the innovative reinforcement member, the weight and cost of the vehicle structure can be reduced while still maintaining or even improving the rigidity and reinforcement of the vehicle structure. By means of the innovative reinforcement member, the performance of the vehicle structure in collisions is improved. An advantage of the vehicle structure including the innovative reinforcement member is that an improved vehicle structure is provided. The vehicle structure may be a vehicle structure for a motor vehicle with a combustion engine, an electric vehicle having one or more electric batteries or a hybrid vehicle, for example a car, or a truck.

According to an advantageous embodiment of the vehicle structure according to the present invention, the foot of the first leg and the foot of the second leg point substantially in the same first direction, wherein the first direction is transverse to the longitudinal direction. An advantage of this embodiment is that the performance of the vehicle structure in collisions is further improved. Thus, a further improved vehicle structure is provided.

According to a further advantageous embodiment of the vehicle structure according to the present invention, at least one of the first and second legs is substantially parallel to the bottom surface of the compartment of one of the first and second members. An advantage of this embodiment is that the performance of the vehicle structure in collisions is further improved. Thus, a further improved vehicle structure is provided.

According to another advantageous embodiment of the vehicle structure according to the present invention, at least one of the first and second legs abuts against the bottom surface of the compartment of one of the first and second members. An advantage of this embodiment is that the performance of the vehicle structure in collisions is further improved. Thus, a further improved vehicle structure is provided. In some embodiments, each of the first and second legs abuts against the bottom surface of the compartment of one of the first and second members. For example, by way of the above-mentioned one or more abutments against one or more of the bottom surfaces of the compartments of the first and second members, the reinforcement member may be immovable in relation to the first and second members when there is no collision.

According to still another advantageous embodiment of the vehicle structure according to the present invention, the first leg is substantially parallel to the bottom surface of the compartment of the one of the first and second members which is closer to the first leg in relation to the other one of the first and second members. An advantage of this embodiment is that the performance of the vehicle structure in collisions is further improved. Thus, a further improved vehicle structure is provided. However, in some embodiments, the first leg may be orientated in other ways different from being substantially parallel to the bottom surface of the compartment of one of the first and second members.

According to a further advantageous embodiment of the vehicle structure according to the present invention, one or more of the first and second legs is/are attached to the bottom surface of the compartment of one of the first and second members. For example, by way of the above-mentioned one or more attachments to one or more of the bottom surfaces of the compartments of the first and second members, the reinforcement member may be immovable in relation to the first and second members when there is no collision. However, in some embodiments, no one of the first and second legs is attached to the bottom surface of the compartment of any one of the first and second members, i.e. each of the first and second legs may be detached from the bottom surfaces of the compartments of the first and second members. In some embodiments, one or more of the first and second legs is/are attached to one of the first and second members, for example attached to other portions of the first or second member different from the bottom surface of the compartment. In some embodiments, one or more of the first and second legs is/are detached from the first and second members.

According to yet another advantageous embodiment of the vehicle structure according to the present invention, the first leg is attached to the bottom surface of the compartment of one of the first and second members. An advantage of this embodiment is that an advantageous deformation of the vehicle structure for absorbing impacts is provided, while maintaining or improving the rigidity and reinforcement of the vehicle structure. Thus, an advantage of this embodiment is that the performance of the vehicle structure in collisions is further improved. Therefore, a further improved vehicle structure is provided.

According to an advantageous embodiment of the vehicle structure according to the present invention, the reinforcement member has a substantially concave surface and a substantially convex surface, wherein at the substantially convex surface each ridge of the head section has a recess at a location which is central in relation to the first and second legs. An advantage of this embodiment is that an advantageous deformation of the vehicle structure for absorbing impacts is provided, while maintaining or improving the rigidity and reinforcement of the vehicle structure. Thus, an advantage of this embodiment is that the performance of the vehicle structure in collisions is further improved. Therefore, a further improved vehicle structure is provided.

According to a further advantageous embodiment of the vehicle structure according to the present invention, the recesses are in alignment with one another in the longitudinal direction. An advantage of this embodiment is that an advantageous deformation of the vehicle structure for absorbing impacts is provided, while maintaining or improving the rigidity and reinforcement of the vehicle structure. Thus, an advantage of this embodiment is that the performance of the vehicle structure in collisions is further improved. Therefore, a further improved vehicle structure is provided.

According to another advantageous embodiment of the vehicle structure according to the present invention, in a direction transverse to the longitudinal direction the first leg is longer than the second leg in a direction transverse to the longitudinal direction. An advantage of this embodiment is that the performance of the vehicle structure in collisions is further improved. Thus, a further improved vehicle structure is provided.

According to yet another advantageous embodiment of the vehicle structure according to the present invention, the first leg is substantially flat. An advantage of this embodiment is that the performance of the vehicle structure in collisions is further improved. Thus, a further improved vehicle structure is provided.

According to still another advantageous embodiment of the vehicle structure according to the present invention, the second leg is corrugated and comprises corrugations, wherein the corrugations of the second leg comprise ridges and grooves, wherein each ridge of the second leg extends between the foot of the second leg and the head section, and wherein each groove of the second leg extends between the foot of the second leg and the head section. An advantage of this embodiment is that an advantageous deformation of the vehicle structure for absorbing impacts is provided, while maintaining or improving the rigidity and reinforcement of the vehicle structure. Thus, an advantage of this embodiment is that the performance of the vehicle structure in collisions is further improved. Therefore, a further improved vehicle structure is provided.

According to an advantageous embodiment of the vehicle structure according to the present invention, each of the first and second members has a first side wall and a second side wall, wherein the first side wall is located on one side of the bottom surface while the second side wall is located on the opposite side of the bottom surface, wherein the first and second walls of the first member and the bottom surface of the compartment of the first member define the compartment of the first member, wherein the first and second walls of the second member and the bottom surface of the compartment of the second member define the compartment of the second member, wherein the first side wall of the first member is attached to the first side wall of the second member, and wherein the second side wall of the first member is attached to the second side wall of the second member. An advantage of this embodiment is that the performance of the vehicle structure in collisions is further improved. Thus, a further improved vehicle structure is provided.

According to a further advantageous embodiment of the vehicle structure according to the present invention, each of the first and second members has a first side wall and a second side wall, wherein the first side wall is located on one side of the bottom surface while the second side wall is located on the opposite side of the bottom surface, wherein the first and second walls of the first member and the bottom surface of the compartment of the first member define the compartment of the first member, wherein the first and second walls of the second member and the bottom surface of the compartment of the second member define the compartment of the second member, wherein each of the first and second members has a first flange attached to the first side wall, wherein each of the first and second members has a second flange attached to the second side wall, wherein the first flange of the first member is attached to the first flange of the second member, and wherein the second flange of the first member is attached to the second flange of the second member. An advantage of this embodiment is that the performance of the vehicle structure in collisions is further improved. Thus, a further improved vehicle structure is provided.

According to a further advantageous embodiment of the vehicle structure according to the present invention, the head section faces the first side walls. More specifically, according to this embodiment, the convex surface of the head section faces the first side walls. An advantage of this embodiment is that the performance of the vehicle structure in collisions is further improved. Thus, a further improved vehicle structure is provided.

According to another advantageous embodiment of the vehicle structure according to the present invention, the foot of the first leg and the foot of the second leg point substantially toward or face the second side walls. An advantage of this embodiment is that the performance of the vehicle structure in collisions is further improved. Thus, a further improved vehicle structure is provided.

According to yet another advantageous embodiment of the vehicle structure according to the present invention, the reinforcement member is formed from a plate, for example a metal plate of a metal alloy plate. This is an efficient way to produce the reinforcement member.

According to still another advantageous embodiment of the vehicle structure according to the present invention, the reinforcement member comprises or consists of a metal or a metal alloy. This is an efficient way to produce the reinforcement member.

According to an advantageous embodiment of the vehicle structure according to the present invention, each of the first and second members is formed from a plate, for example a metal plate or a metal allow plate. This is an efficient way to produce the reinforcement member.

According to a further advantageous embodiment of the vehicle structure according to the present invention, each of the first and second members comprises or consists of a metal or a metal alloy. This is an efficient way to produce the reinforcement member.

According to another advantageous embodiment of the vehicle structure according to the present invention, each of the first and second members is one of: a hat profile and a U-profile. This is an efficient way to produce the first and second members.

According still another advantageous embodiment of the vehicle structure according to the present invention, the vehicle structure is a vehicle side structure, and the portion is a side portion. The vehicle structure is suitable to be applied as a vehicle side structure of a vehicle, whereby the performance of a vehicle side structure in collisions is improved. Thus, an improved vehicle side structure is provided. However, in alternative embodiments, the vehicle structure may be applied and mounted elsewhere to the vehicle, for example in the front of the vehicle, and may there be part of a bumper, in the rear of the vehicle, or elsewhere within the vehicle. The vehicle structure may for example be used in an electric vehicle or a hybrid vehicle, but of course also in a regular vehicle with a combustion engine only. The vehicle structure may be configured to protect an electric battery of an electric vehicle or a hybrid vehicle. Thus, the vehicle structure may be located at one or more sides of an electric battery located in a vehicle.

According to yet another advantageous embodiment of the vehicle structure according to the present invention, the portion is a side sill portion, and wherein the side sill portion extends in a longitudinal direction of a vehicle body and is provided at a side of the vehicle body. An advantage of this embodiment is that an advantageous deformation of the vehicle structure having a side sill portion for absorbing impacts is provided while maintaining or improving the rigidity and reinforcement of a vehicle structure. The innovative reinforcement member is especially advantageous for a side sill portion of the vehicle structure, where impacts should be absorbed upon certain collisions. However, in alternative embodiments, instead of a side sill portion, the portion or side portion may be a side beam portion, a bumper portion, or a beam portion configured to be located elsewhere in a vehicle.

According to still advantageous embodiment of the vehicle structure according to the present invention, the side sill portion is attached to one or more cross beams of the vehicle body. Hereby, the rigidity of the vehicle structure may be further improved.

The above-mentioned features and embodiments of the vehicle structure may be combined in various possible ways providing further advantageous embodiments.

Further advantageous embodiments of the vehicle structure according to the present invention and further advantages with the embodiments of the present invention emerge from the dependent claims and the detailed description of embodiments.

BRIEF DESCRIPTION OF THE DRAWINGS

The present invention will now be described, for exemplary purposes, in more detail by way of embodiments and with reference to the enclosed drawings, in which.

DETAILED DESCRIPTION

Figure 1:
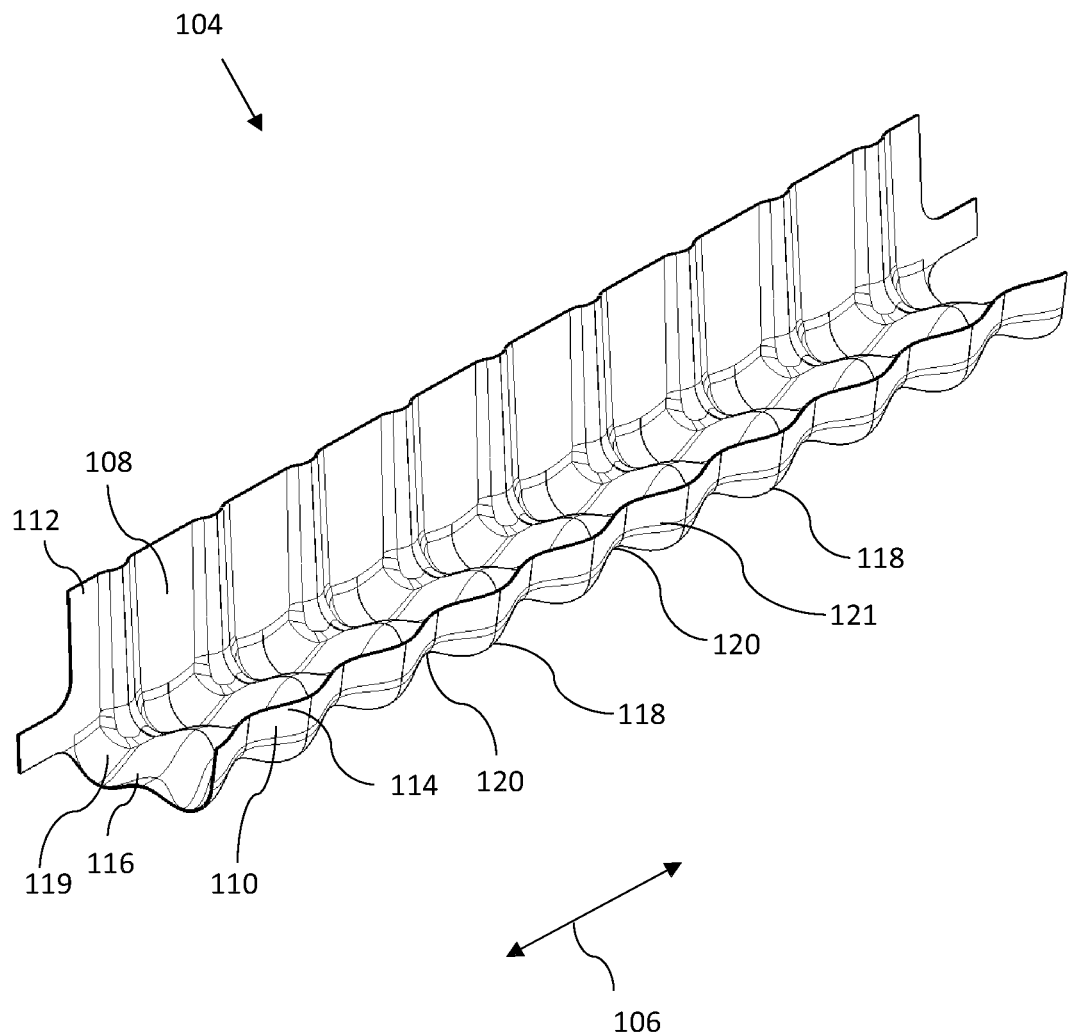
FIG. 1 is a schematic perspective view of a reinforcement member of a first embodiment of the vehicle structure according to the present invention.
Figure 2:
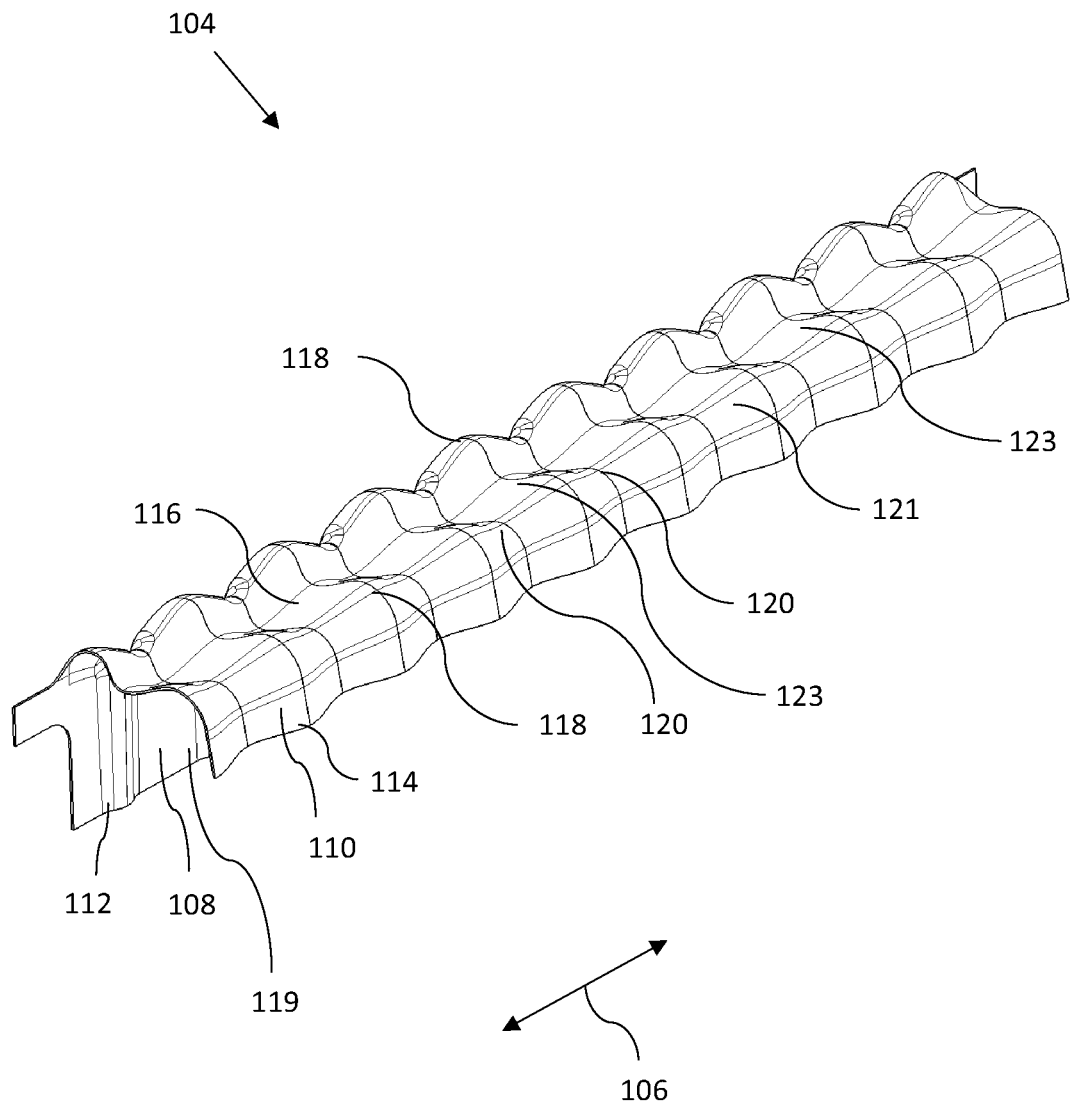
FIG. 2 is a schematic perspective view of the reinforcement member of FIG. 1 from a different perspective.

With reference to FIGS. 1 to 4 and 6, a portion 102 of the vehicle structure 100 according to a first embedment includes a reinforcement member 104. The reinforcement member 104 extends in a longitudinal direction 106. The reinforcement member 104 may comprise or consist of a metal or a metal alloy. The reinforcement member 104 may be formed from a plate, for example a metal plate or a metal alloy plate, such as a plate of aluminium, or any other suitable material, which may be processed by press hardening. The reinforcement member 104 is smoothly wave-shaped in the longitudinal direction 106.

The reinforcement member 104 has a first leg 108 which extends in a direction transverse to the longitudinal direction 106. The reinforcement member 104 has a second leg 110 which extends in a direction transverse to the longitudinal direction 106. Each leg 108, 110 of the first and second legs 108, 110 has a foot 112, 114 which extends in the longitudinal direction 106. For some embodiments, it may be defined that the foot 112 of the first leg 108 is located at an end of the first leg 108, or that the foot 112 of the first leg 108 forms an end of the first leg 108. For some embodiments, it may be defined that the foot 114 of the second leg 110 is located at an end of the second leg 110, or that the foot 114 of the second leg 110 forms an end of the second leg 110. The foot 112 of the first leg 108 and the foot 114 of the second leg 110 are spaced apart from one another. The first and second legs 108, 110 are joined in a head section 116. For some embodiments, it may be defined that the head section 116 is located at ends of the first and second legs 108, 110 which are different from, or opposing, the ends of the first and second legs 108, 110 including or forming the feet 112, 114 of the first and second legs 108, 110. In the shown embodiment, in a direction transverse to the longitudinal direction 106 the first leg 108 is longer than the second leg 110 in a direction transverse to the longitudinal direction 106. In the shown embodiment, the first leg 108 is substantially flat.

Figure 12:
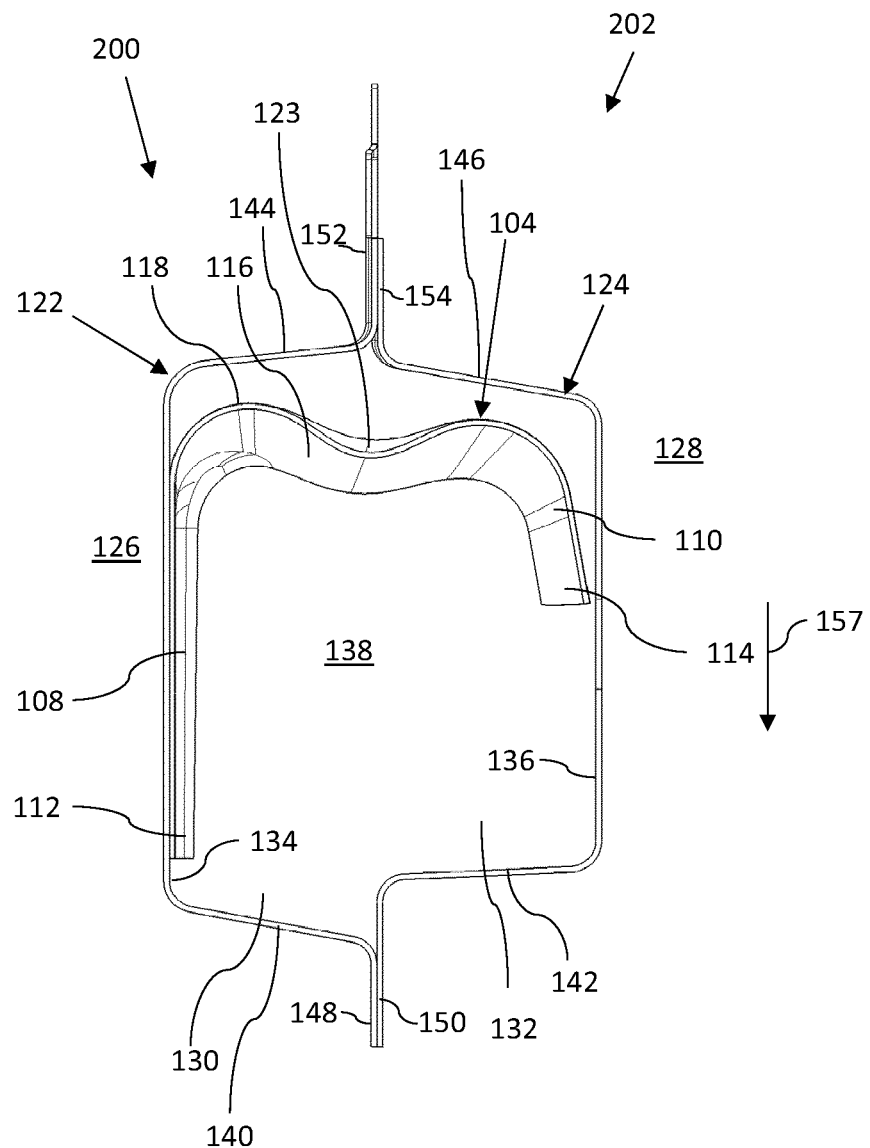
FIG. 12 is a cross-section of the assembled portion of the second embodiment of the vehicle structure of FIG. 11 including the reinforcement member.

The head section 116 is corrugated in the longitudinal direction 106 to form a smooth wave shape. The head section 116 includes corrugations. The head section 116 may be corrugated substantially along its entire longitudinal extension or length. The corrugations of the head section 116 include ridges 118 and grooves 120. The head section 116 may comprise a plurality of ridges 118, for example five or ten ridges 118 or more, and a plurality of grooves 120, for example five or ten grooves 120 or more. Each ridge 118 extends between the first leg 108 and the second leg 110. Each groove 120 extends between the first leg 108 and the second leg 110. By means of these innovative corrugations, an advantageous deformation of the vehicle structure 100, 200, 300, 400 (see FIGS. 12 to 14) for absorbing impacts is attained while maintaining or improving the rigidity and reinforcement of the vehicle structure 100, 200, 300, 400 (see FIGS. 12 to 14).

The head section 116 and the first and second legs 108, 110 of the reinforcement member 104 can be described as forming a W-shape or a U-shape with a foot 112, 114 at each end of the W-shape or U-shape. Thus, the reinforcement member 104 may have a U-shaped or W-shaped cross-section. However, other shapes are possible, for example a V-shaped cross-section.

With reference to FIGS. 1 to 4, the reinforcement member 104 has a substantially concave surface 119 and a substantially convex surface 121. At the substantially convex surface 121 each ridge 118 of the head section 116 has a recess 123 at a location which is central in relation to the first and second legs 108, 110. The recesses 123 may be in alignment with one another in the longitudinal direction 106.

Figure 3:
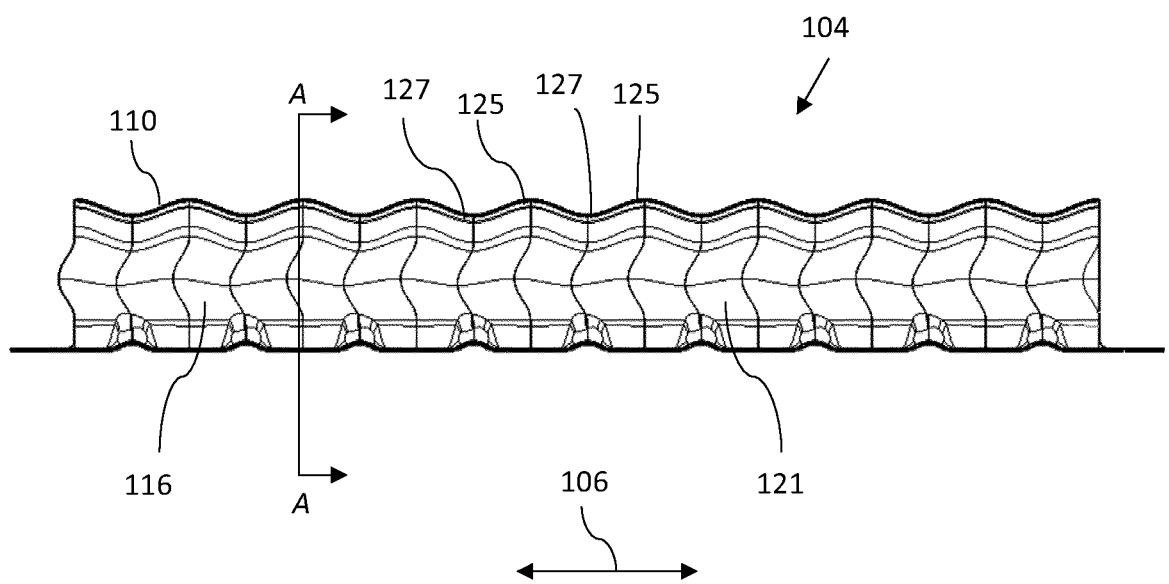
FIG. 3 is a schematic side view of the reinforcement member of FIG. 1.
Figure 4:
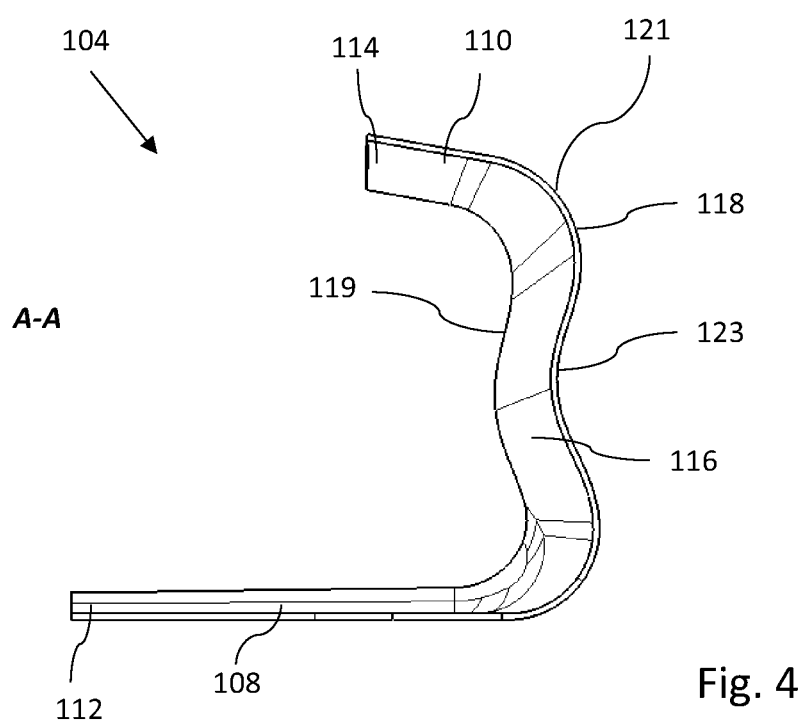
FIG. 4 is a cross-section of the reinforcement member of FIG. 3.
Figure 5:
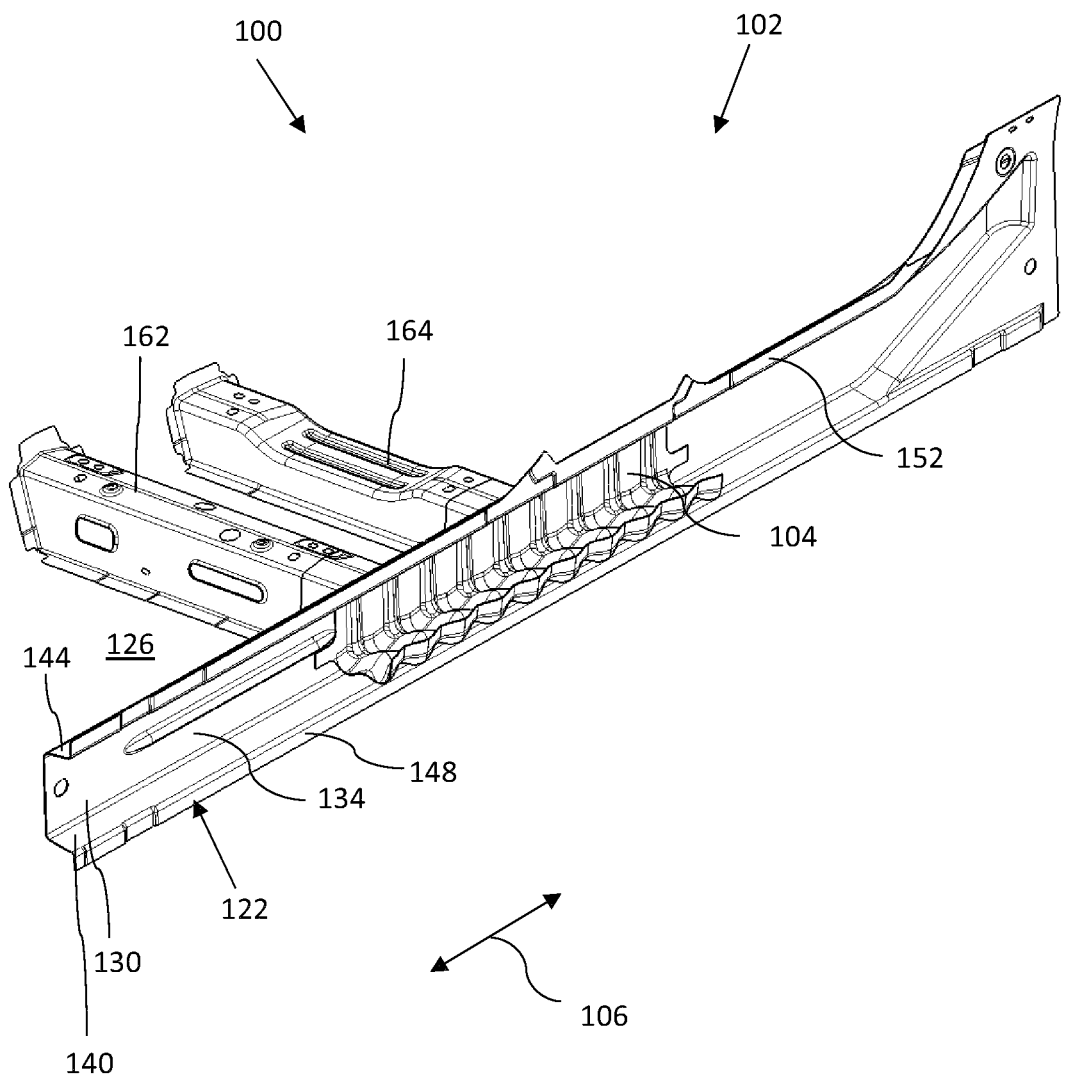
FIG. 5 is a partial schematic perspective view of a first embodiment of the vehicle structure according to the present invention, including the reinforcement member of FIGS. 1 to 4.
Figure 6:
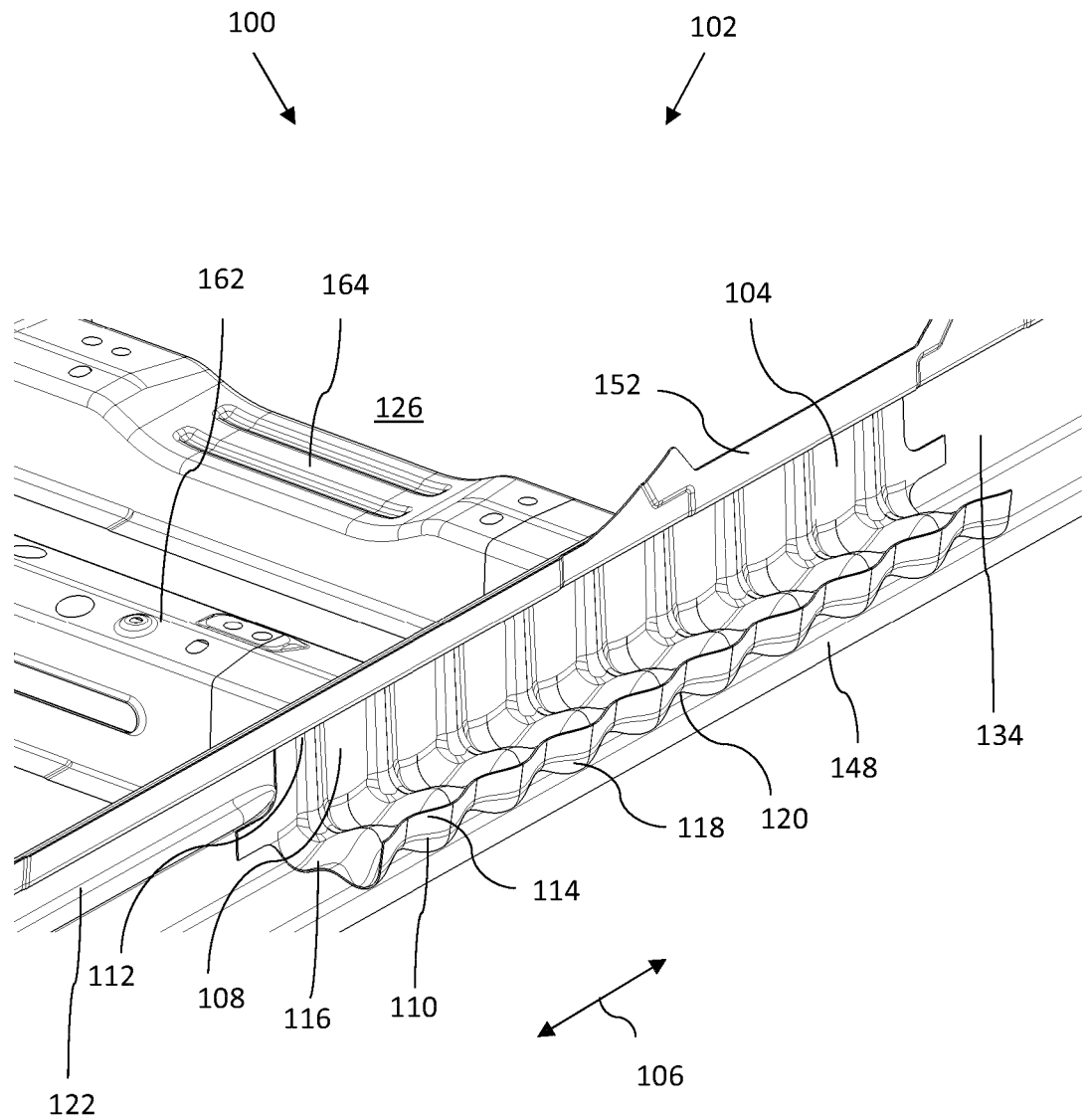
FIG. 6 is an enlargement of a section of the vehicle structure of FIG. 5, illustrating the position of the reinforcement member of the vehicle structure.
Figure 7:
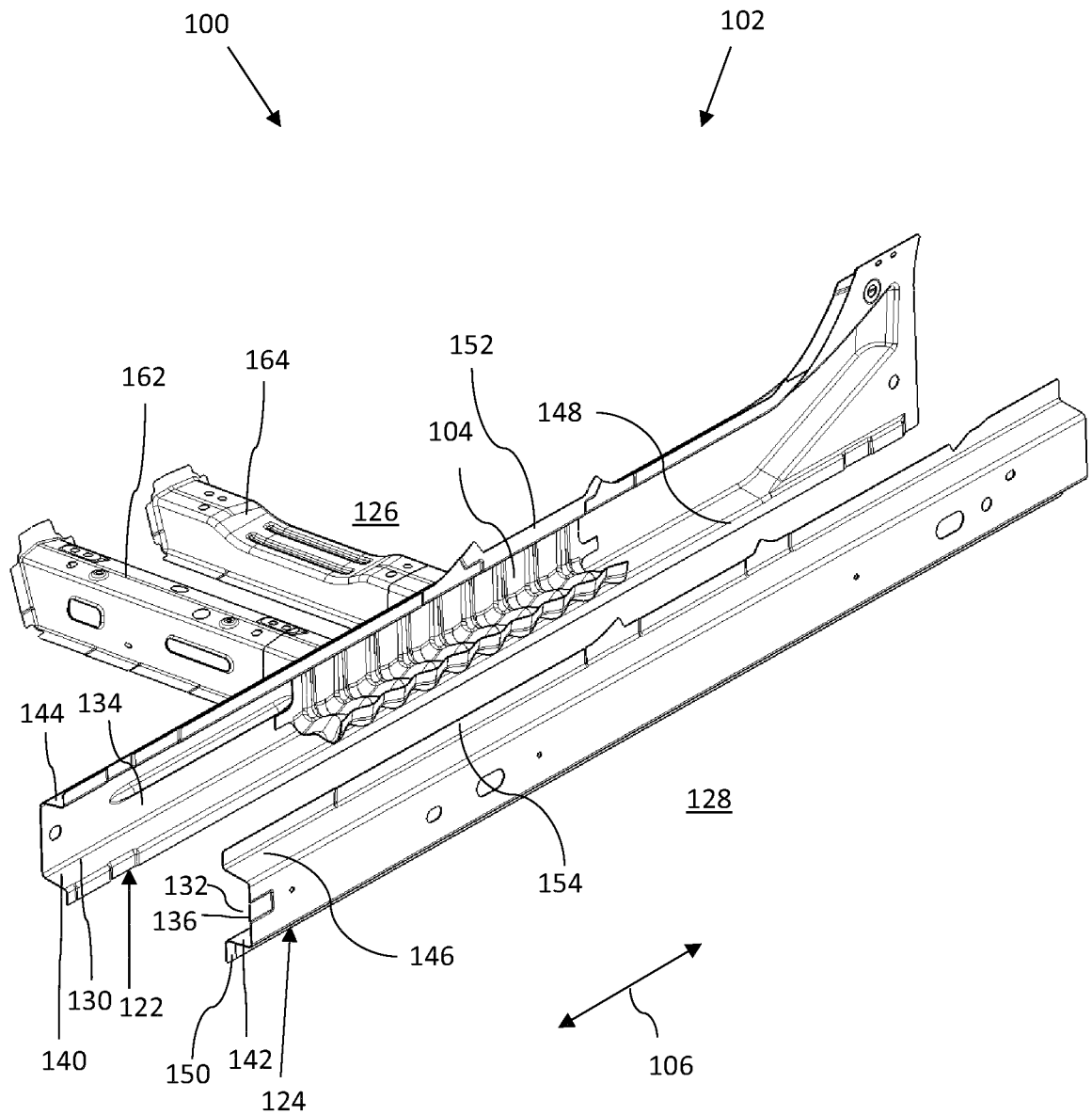
FIG. 7 is a schematic exploded perspective view of the first embodiment of the vehicle structure of FIG. 8.

With reference to FIG. 3, in the shown embodiment, the second leg 110 is corrugated and comprises corrugations. The corrugations of the second leg 110 include ridges 125 and grooves 127. Each ridge 125 of the second leg 110 extends between the foot 114 of the second leg 110 and the head section 116. Each groove 127 of the second leg 110 extends between the foot 114 of the second leg 110 and the head section 116. In alternative embodiments, the second leg 110 may be substantially flat.

The vehicle structure 100 may be a vehicle structure 100 for a motor vehicle, for example a car, or a truck. With reference to FIGS. 5 to 8, the vehicle structure 100 includes a portion 102 extending in the longitudinal direction 106. The portion 102 has a first member 122 which extends in the longitudinal direction 106. The portion 102 has a second member 124 which extends in the longitudinal direction 106. The first member 122 is configured to face an inside 126 of a vehicle, for example a motor vehicle, such as a car. The second member 124 is configured to face an outside 128 of the same vehicle. Thus, when the vehicle structure 100 has been installed, the first member 122 may face the inside 126 of the vehicle while the second member 124 may face the outside 128 of the same vehicle. Each 122, 124 of the first and second members 122, 124 has a compartment 130, 132 which extends in the longitudinal direction 106. Each compartment 130, 132 has a bottom surface 134, 136 configured to face one 126, 128 of the inside 126 and outside 128 of the vehicle. More specifically, it may be defined that the bottom surface 134 of the compartment 130 of the first member 122 is configured to face the outside 128 of the vehicle. More specifically, it may be defined that the bottom surface 136 of the compartment 132 of the second member 124 is configured to face the inside 126 of the vehicle. Thus, when the vehicle structure 100 has been installed, the bottom surface 134 of the compartment 130 of the first member 122 may face the outside 128 of the vehicle while the bottom surface 136 of the compartment 132 of the second member 124 may face the inside 126 of the same vehicle. For some embodiments, it may be defined that the bottom surfaces 134, 136 of the compartments 130, 132 of the first and second members 122, 124 are configured to face one another. For some embodiments, it may be defined that, when the vehicle structure 100 has been installed in a vehicle while wheels of the vehicle rest on the ground or on a surface, each one 134, 136 of the bottom surfaces 134, 136 of the compartments 130, 132 of the first and second members 122, 124 is configured to extend substantially perpendicular to the ground or the surface on which the wheels of the vehicle rest.

With reference to FIGS. 5 to 12, for some embodiments, it may be defined that, when the vehicle structure 100 has been installed in a vehicle while wheels of the vehicle rest on the ground or on a surface, each one 108, 110 of first and second legs 108, 110 is configured to extend substantially perpendicular to the ground or the surface on which the wheels of the vehicle rest. For some embodiments, it may be defined that, when the vehicle structure 100 has been installed in a vehicle, a space formed between the first second legs 108, 110 opens at least upward or at least downward.

The first and second members 122, 124 are attached to one another such that the compartments 130, 132 and the first and second members 122, 124 form or define a substantially closed space 138. The first and second members 122, 124 may be attached to one another for example by means of welding, an adhesive or a mechanical locking structure, such as rivets, or any other suitable fastening means etc. Each 122, 124 of the first and second members 122, 124 may comprise or consist of a metal or a metal alloy. Each 122, 124 of the first and second members 122, 124 may be formed from a plate, for example a metal plate or a metal alloy plate, such as a plate of aluminium, which may be processed by press hardening.

Each 122, 124 of the first and second members 122, 124 in the shown embodiment is a hat profile. More specifically, in the shown embodiment, each 122, 124 of the first and second members 122, 124 has a first side wall 140, 142 and a second side wall 144, 146. The first side wall 140, 142 is located on one side of the bottom surface 134, 136 while the second side wall 144, 146 is located on the opposite side of the bottom surface 134, 136. The first and second walls 140, 144 of the first member 122 and the bottom surface 134 of the compartment 130 of the first member 122 define or form the compartment 130 of the first member 122. In a corresponding way, the first and second walls 142, 146 of the second member 124 and the bottom surface 136 of the compartment 132 of the second member 124 define or form the compartment 132 of the second member 124. Each 122, 124 of the first and second members 122, 124 has a first flange 148, 150 attached to, for example formed integrally with, the first side wall 140, 142. Each 122, 124 of the first and second members 122, 124 has a second flange 152, 154 attached to, for example formed integrally with, the second side wall 144, 146. The first flange 148 of the first member 122 is attached, example by means of welding or an adhesive, to the first flange 150 of the second member 124. The second flange 152 of the first member 122 is attached, example by means of welding or an adhesive, to the second flange 154 of the second member 124. However, other means of attachments are possible, for example as mentioned above.

In alternative embodiments, each 122, 124 of the first and second members 122, 124 could be a U-profile. Then, the first side wall 140 of the first member 122 could be attached, example by means of welding, to the first side wall 142 of the second member 124, and the second side wall 144 of the first member 122 could be attached, example by means of welding, to the second side wall 146 of the second member 124. However, other means of attachments are possible, for example as mentioned above.

Figure 8:
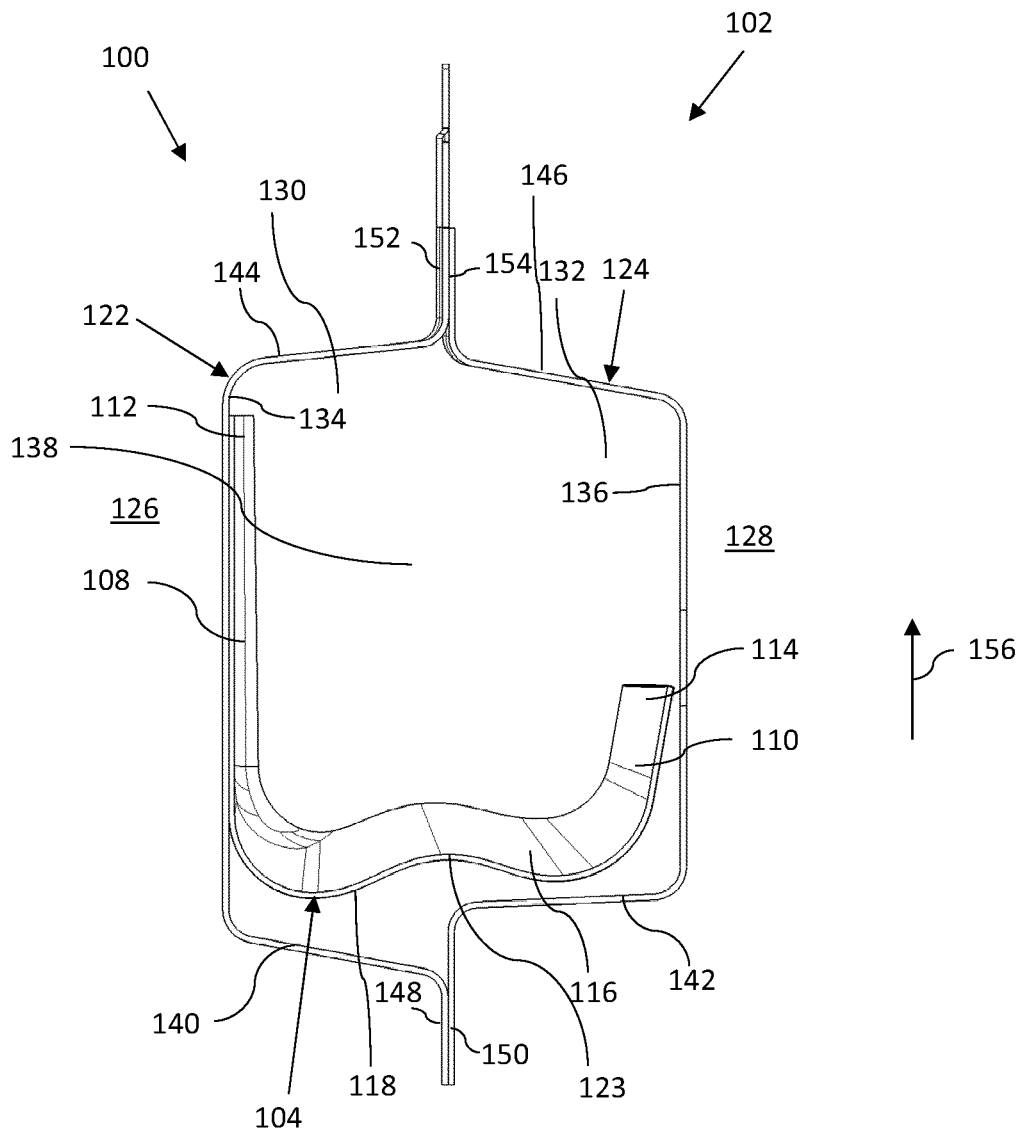
FIG. 8 is a cross-section of the assembled portion of the first embodiment of the vehicle structure of FIG. 7 including the reinforcement member.
Figure 9:
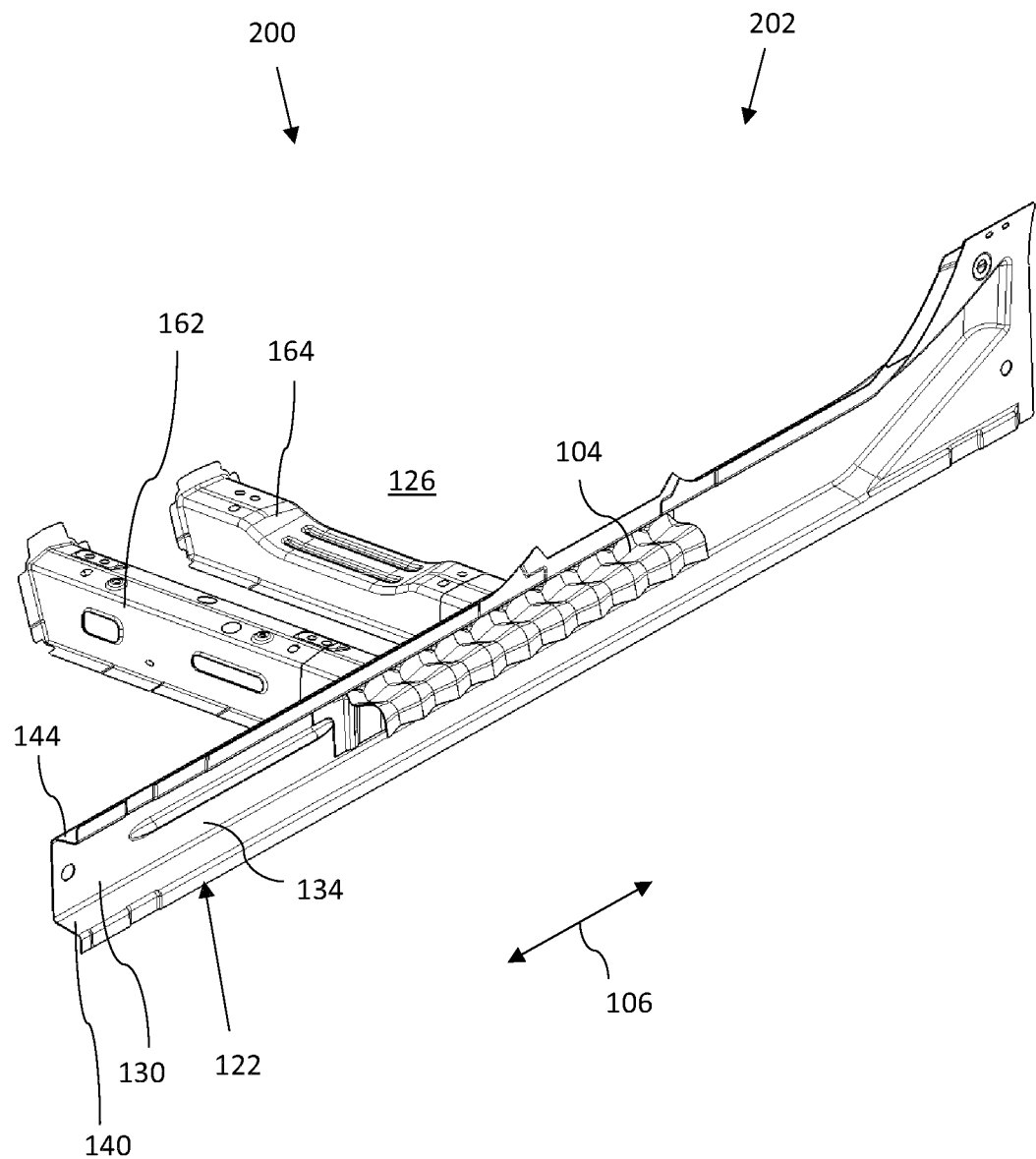
FIG. 9 is a partial schematic perspective view of a second embodiment of the vehicle structure according to the present invention, including the reinforcement member of FIGS. 1 to 4, but the reinforcement member is arranged differently between the first and second members.
Figure 10:
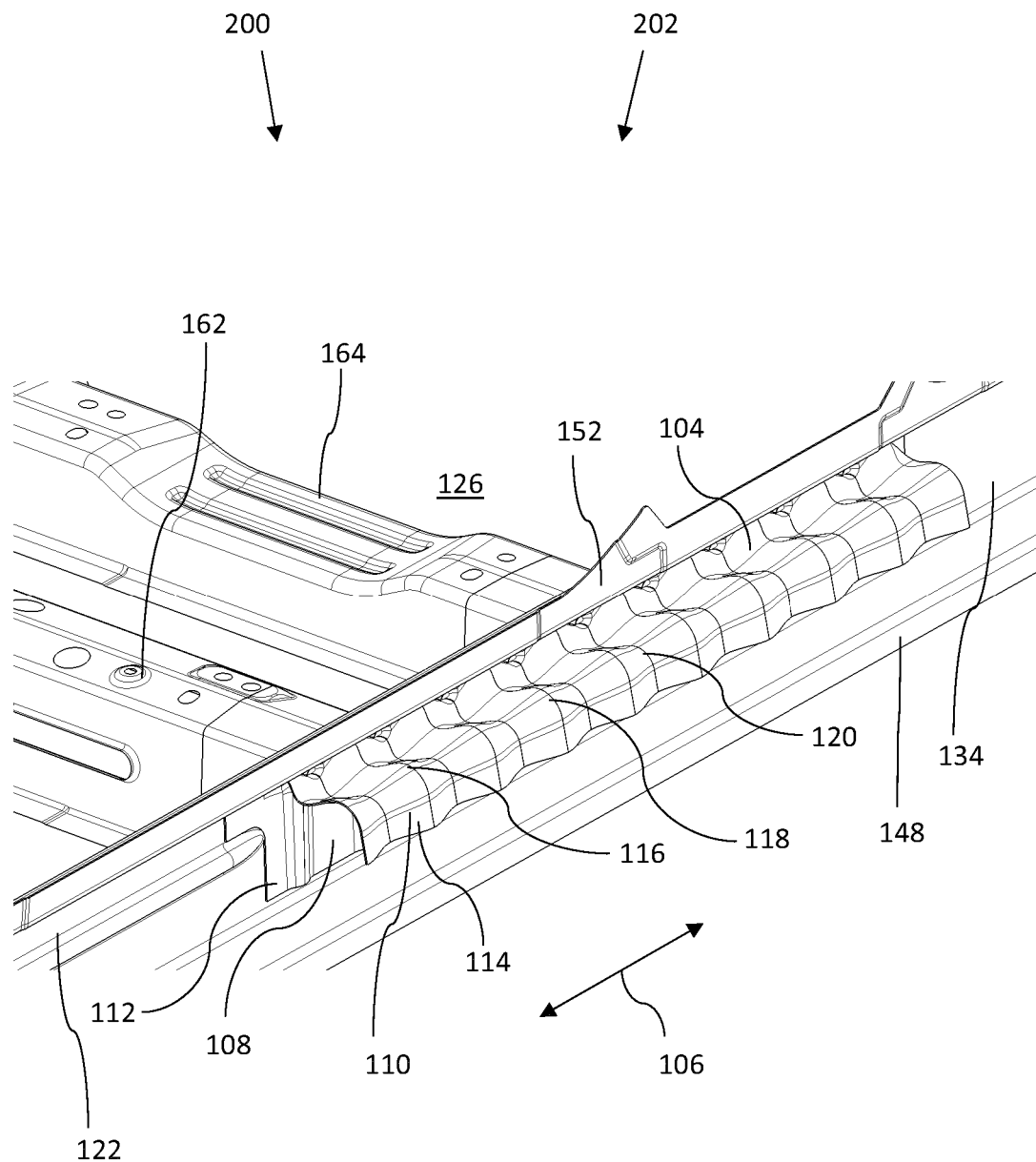
FIG. 10 is an enlargement of a section of the vehicle structure of FIG. 9, illustrating the position of the reinforcement member of the vehicle structure.
Figure 11:
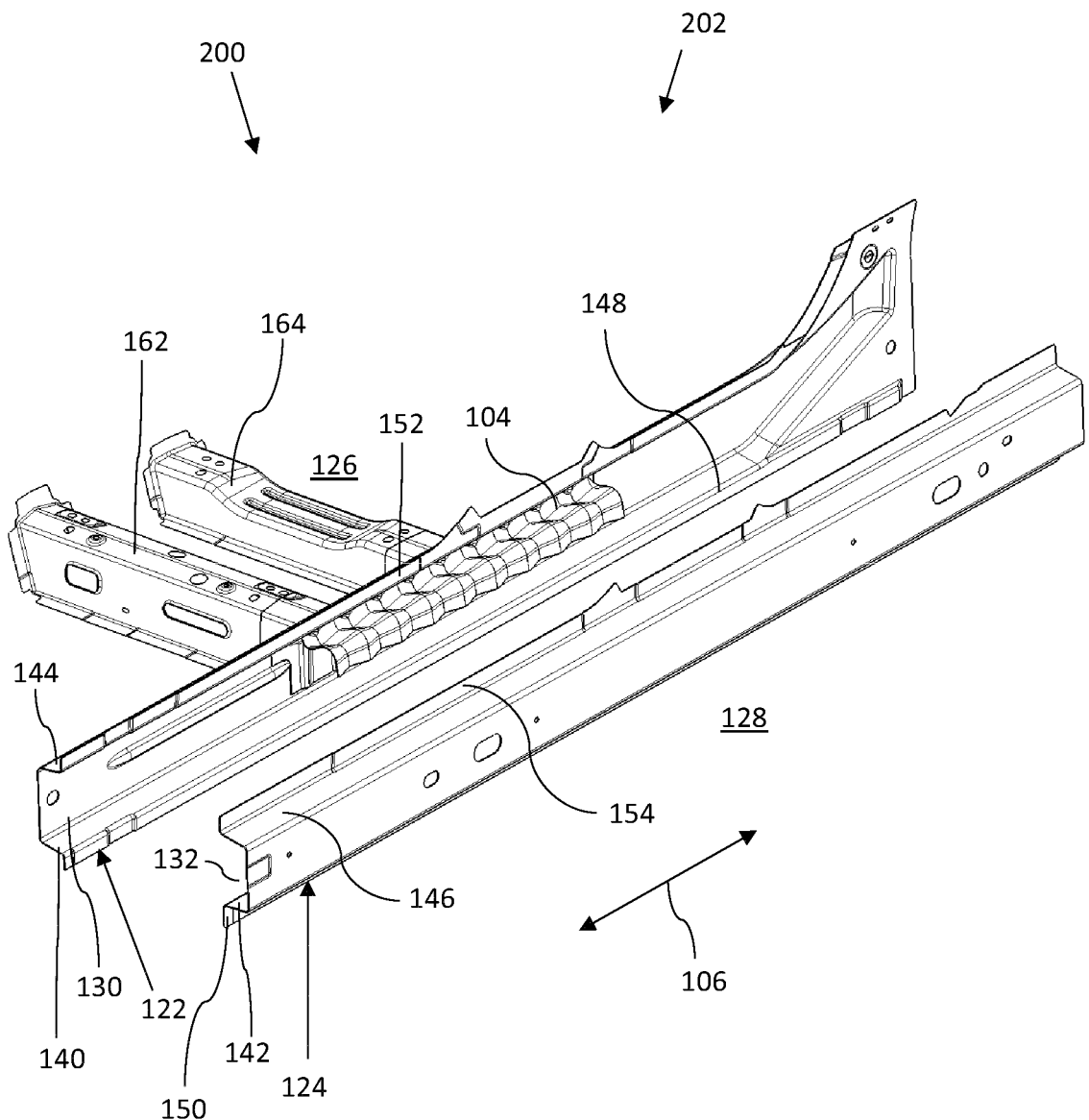
FIG. 11 is a schematic exploded perspective view of the second embodiment of the vehicle structure of FIG. 12.

As mentioned above, the portion 102 includes one or more reinforcement members 104, for example as disclosed in connection with FIGS. 1 to 4, located in the substantially closed space 138. The reinforcement member 104 extends in the longitudinal direction 106. With reference to FIG. 8, the first leg 108 is located between the second leg 110 and the bottom surface 134, 136 of the compartment 130, 132 of one 122, 124 of the first and second members 122, 124 while the second leg 110 is located between the first leg 108 and the bottom surface 134, 136 of the compartment 130, 132 of the other one 122, 124 of the first and second members 122, 124. In the shown embodiment, the first leg 108 is located between the second leg 110 and the bottom surface 134 of the compartment 130 of the first member 122 while the second leg 110 is located between the first leg 108 and the bottom surface 136 of the compartment 132 of the second member 124. However, in alternative embodiments, the first leg 108 could be located between the second leg 110 and the bottom surface 136 of the compartment 132 of the second member 124 while the second leg 110 could be located between the first leg 108 and the bottom surface 134 of the compartment 130 of the first member 122. Each 108, 110 of the first and second legs 108, 110 may be located in a compartment 130, 132 of one 122, 124 of the first and second members 122, 124. In the shown embodiment, the first leg 108 is located in the compartment 130 of the first member 122 while the second leg 110 is located in the compartment 132 of the second member 124.

It is to be understood that one or more additional sections or one or more additional members may be placed between the first leg 108 and the second leg 110. It is to be understood that one or more additional sections or one or more additional members may be placed between the first leg 108 and the bottom surface 134 of the compartment 130 of the closest member 122 of the first and second members 122, 124. It is to be understood that one or more additional sections or one or more additional members may be placed between the second leg 110 and the bottom surface 136 of the compartment 132 of the closest member 124 of the first and second members 122, 124. It is to be understood that one or more additional sections or one or more additional members may be placed between the first or second member 122, 124 and the inside 126 or the outside 128 of the vehicle, especially when the vehicle is assembled.

With reference to FIG. 8, in the shown embodiment, the foot 112 of the first leg 108 of the reinforcement member 104 and the foot 114 of the second leg 110 of the same reinforcement member 104 point substantially in the same first direction 156. The first direction 156 is transverse to the longitudinal direction 106. The first direction 156 may be an upward direction, for example when the vehicle structure 100 has been installed. The foot 112 of the first leg 108 of the reinforcement member 104 and the foot 114 of the second leg 110 of the same reinforcement members 104 point substantially toward or face the second side walls 144, 146 of the first and second members 122, 124. With reference to FIG. 8, in the shown embodiment, the head section 116 faces the first side walls 140, 142 of the first and second members 122, 124. The fact that the head section 116 faces the first side walls 140, 142 of the first and second members 122, 124 does not necessarily mean that there is an empty space between the head section 116 and the first side walls 140, 142. Instead, in alternative embodiments, there may be other members or units therebetween.

With reference to FIG. 8, at least one of the first and second legs 108, 110, for example the first leg 108, is substantially parallel to the bottom surface 134, 136 of the compartment 130, 132 of one 122, 124 of the first and second members 122, 124, for example the bottom surface 134 of the compartment 130 of the first member 122. At least one 108, 110 of the first and second legs 108, 110, for example the first leg 108, abuts against the bottom surface 134, 136 of the compartment 130, 132 of one 122, 124 of the first and second members 122, 124, for example the bottom surface 134 of the compartment 130 of the first member 122. In the shown embodiment, the first leg 108 is substantially parallel to the bottom surface 134 of the compartment 130 of the one 122 of the first and second members 122, 124 which is closer to the first leg 108 in relation to the other one 124 of the first and second members 122, 124. In the shown embodiment, the first leg 108 is substantially parallel to the bottom surface 134 of the compartment 130 of the first member 122.

With reference to FIG. 8, in the shown embodiment, the first leg 108 is attached to the bottom surface 134, 136 of the compartment 130, 132 of one 122, 124 of the first and second members 122, 124. In the shown embodiment, the first leg 108 is attached to the bottom surface 134 of the compartment 130 of the first member 122. The first leg 108 may be attached to the bottom surface 134, 136 for example by means of welding, an adhesive or a mechanical locking structure, such as rivets, or any other suitable fastening means etc. The first leg 108 may be attached to the bottom surface 134 essentially along the entire length of the first leg 108. Alternatively, or in addition thereto, in alternative embodiments, the second leg 110 may be attached to the bottom surface 134, 136 of the compartment 130, 132 of one 122, 124 of the first and second members 122, 124, for example by means of welding, an adhesive or a mechanical locking structure, such as rivets, or any other suitable fastening means etc.

With reference to FIGS. 9 to 12, a second embodiment of the vehicle structure 200 according to the present invention is schematically illustrated. The only difference in relation to the first embodiment of FIGS. 5 to 8 is that the reinforcement member 104 of the portion 202 is turned 180 degrees in relation to reinforcement member 104 of the portion 102 of FIGS. 5 to 8. Thus, with reference to FIG. 12, the foot 112 of the first leg 108 and the foot 114 of the second leg 110 point substantially toward or face the first side walls 140, 142 of the first and second members 122, 124 while the head section 116 faces the second side walls 144, 146 of the first and second members 122, 124. Thus, with reference to FIG. 12, in the shown embodiment, the foot 112 of the first leg 108 of the reinforcement member 104 and the foot 114 of the second leg 110 of the same reinforcement member 104 point substantially in the same second direction 157. The second direction 157 is transverse to the longitudinal direction 106. The second direction 157 may be a downward direction, for example when the vehicle structure 100 has been installed. Otherwise, the second embodiment of FIGS. 9 to 12 may correspond to the first embodiment of FIGS. 5 to 8 and second embodiment is thus not described in further detail here.

Figure 13:
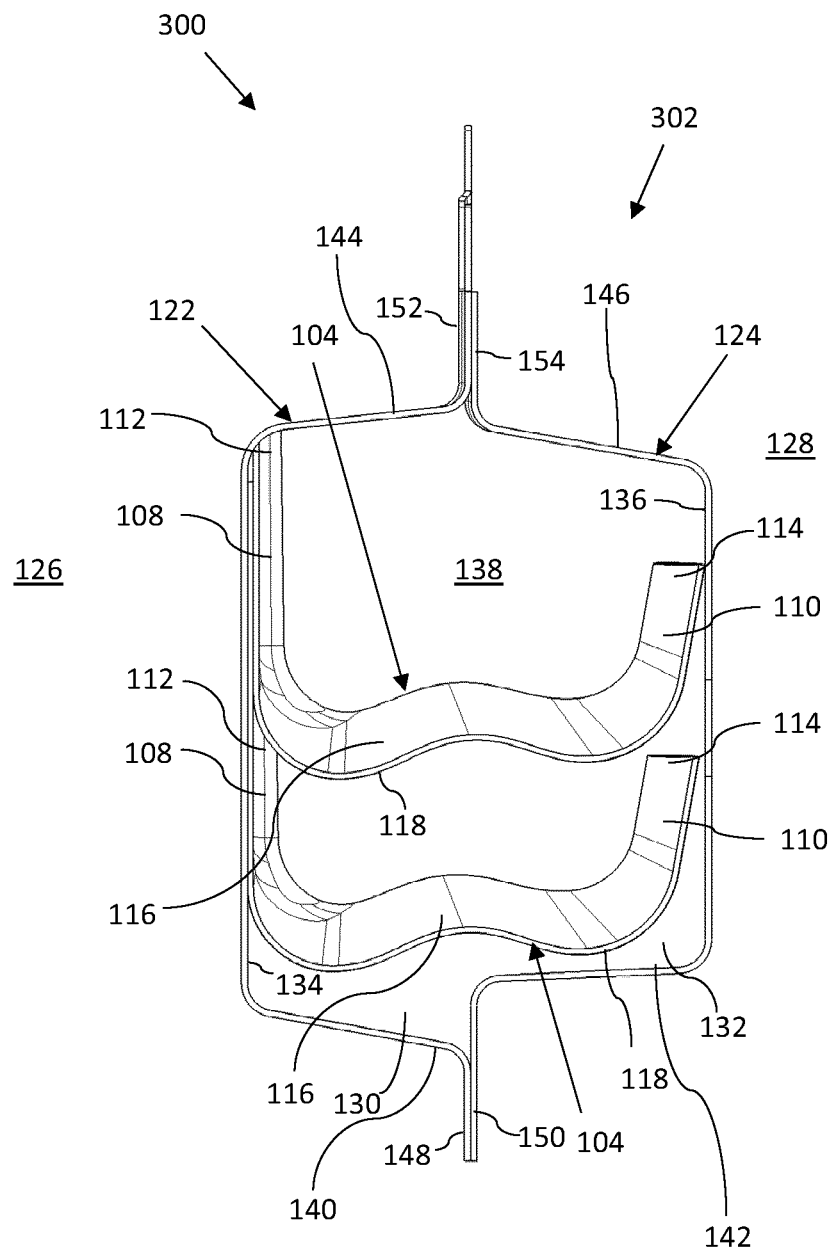
FIG. 13 is a schematic cross-section of an assembled portion of a third embodiment of the vehicle structure including two reinforcement members.
Figure 14:
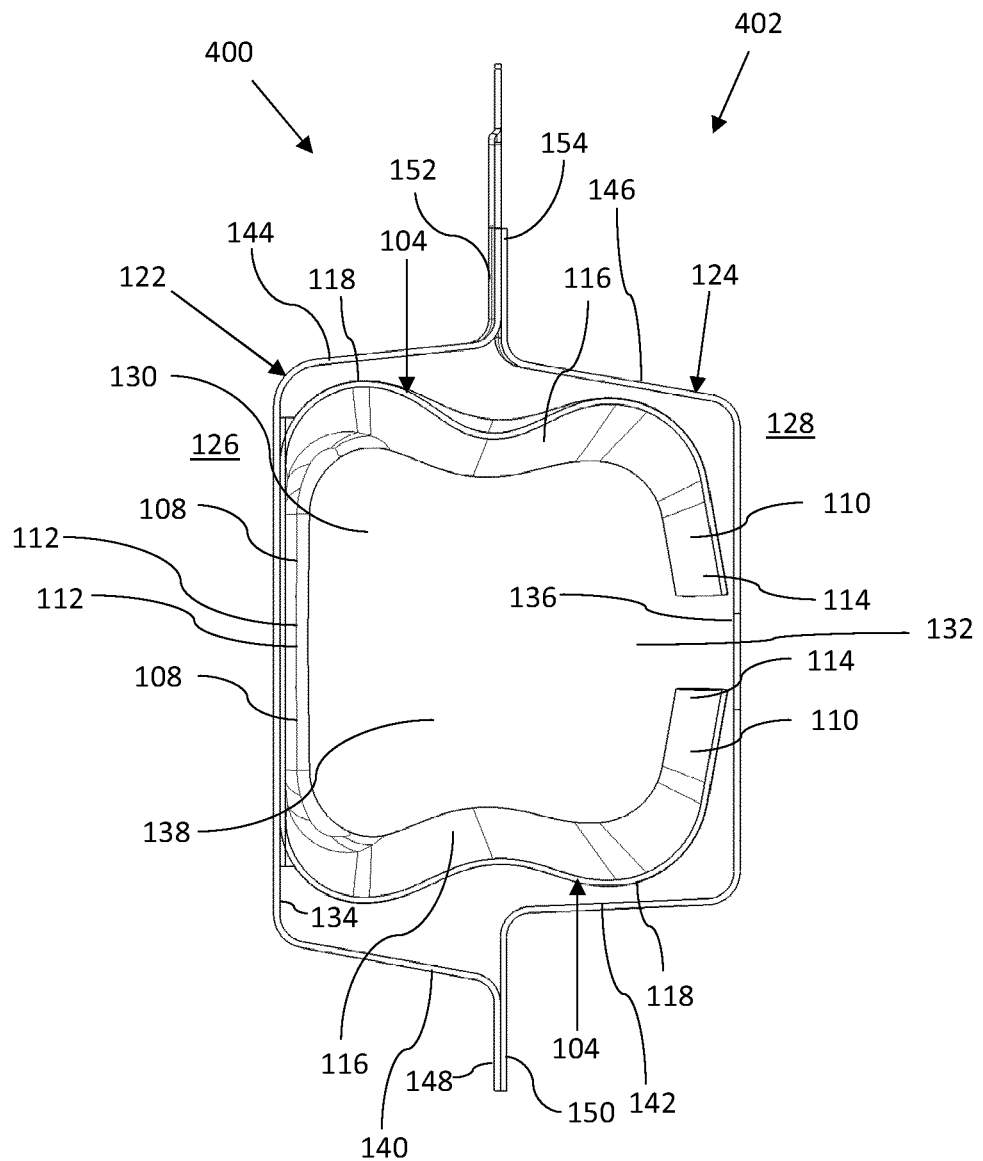
FIG. 14 is a schematic cross-section of an assembled portion of a fourth embodiment of the vehicle structure including two reinforcement members arranged differently in relation to the positions of the two reinforcement members in FIG. 13.

With reference to FIGS. 13 and 14, the portion 302, 402 of embodiments of the vehicle structure 300, 400 may comprise two or more reinforcement members 104 arranged as shown in FIGS. 13 and 14, respectively. Each reinforcement member 104 may correspond to the embodiments of the reinforcement member 104 disclosed above and is thus not described in further detail here. In an alternative embodiment, the first leg 108 of one 104 of the reinforcement members 104 and the first leg 108 of the other one 104 of the reinforcement members 104 may abut or be attached to different members 122, 124 of the first and second members 122, 124.

Each of the vehicle structures 100, 200, 300, 400 described above may be a vehicle side structure 100, 200, 300, 400, and the respective portion 102, 202, 302, 402 may be a side portion 102, 202, 302, 402. However, the vehicle structure 100, 200, 300, 400 may be applied and mounted elsewhere to the vehicle, for example in the front of the vehicle, and may there be part of a bumper, in the rear of the vehicle, or elsewhere within the vehicle. The vehicle structure 100, 200, 300, 400 may for example be used in an electric vehicle or a hybrid vehicle, but of course also in a regular vehicle with a combustion engine only. The vehicle structure 100, 200, 300, 400 may be configured to protect one or more electric batteries of an electric vehicle or a hybrid vehicle. Thus, the vehicle structure 100, 200, 300, 400 may be located at one or more sides of the electric battery.

Each of the described portions 102, 202, 302, 402 is advantageously used as a side sill portion 102, 202, 302, 402. Thus, each of the disclosed embodiments of the portions 102, 202, 302, 402 may be a side sill portion 102, 202, 302, 402. The side sill portion 102, 202, 302, 402 is configured to extend in the longitudinal direction 106 of a vehicle body and is configured to be provided at a side of the vehicle body. Advantageously, the side sill portion 102, 202, 302, 402 is configured to be attached to one or more cross beams 162, 164, for example two cross beams 162, 164 of the vehicle body. However, in alternative embodiments, instead of a side sill portion, the portion or side portion may be a side beam portion, a bumper portion, or a beam portion configured to be located elsewhere in a vehicle.

The features of the different embodiments of the vehicle structure disclosed above may be combined in various possible ways providing further advantageous embodiments.

The invention shall not be considered limited to the embodiments illustrated, but can be modified and altered in many ways by one skilled in the art without departing from the scope of the appended claims.

The invention claimed is:

1. A vehicle structure comprising a portion extending in a longitudinal direction, wherein the portion comprises
a first member extending in the longitudinal direction, and
a second member extending in the longitudinal direction,
wherein the first member is configured to face an inside of a vehicle,
wherein the second member is configured to face an outside of the vehicle,
wherein each of the first and second members has a compartment extending in the longitudinal direction, each compartment having a bottom surface configured to face one of the inside and outside of the vehicle,
wherein the first and second members are attached to one another such that the compartments and the first and second members form a substantially closed space,
wherein the portion comprises one or more reinforcement members located in the substantially closed space, the reinforcement member extending in the longitudinal direction,
wherein the reinforcement member has a first leg extending in a direction transverse to the longitudinal direction,
wherein the reinforcement member has a second leg extending in a direction transverse to the longitudinal direction,
wherein each leg has a foot extending in the longitudinal direction,
wherein the foot of the first leg and the foot of the second leg are spaced apart from one another,
wherein the first and second legs are joined in a head section,
wherein the first leg is located between the second leg and the bottom surface of the compartment of one of the first and second members while the second leg is located between the first leg and the bottom surface of the compartment of the other one of the first and second members,
wherein the head section is corrugated and comprises corrugations, wherein the corrugations comprise ridges and grooves,
wherein each ridge extends between the first leg and the second leg, and
wherein each groove extends between the first leg and the second leg.

2. The vehicle structure according to claim 1, wherein the foot of the first leg and the foot of the second leg point substantially in the same first direction, the first direction being transverse to the longitudinal direction.

3. The vehicle structure according to claim 1, wherein at least one of the first and second legs is substantially parallel to the bottom surface of the compartment of one of the first and second members.

4. The vehicle structure according to claim 1, wherein at least one of the first and second legs abuts against the bottom surface of the compartment of one of the first and second members.

5. The vehicle structure according to claim 1, wherein the first leg is substantially parallel to the bottom surface of the compartment of the one of the first and second members which is closer to the first leg in relation to the other one of the first and second members.

6. The vehicle structure according to claim 1, wherein the first leg is attached to the bottom surface of the compartment of one of the first and second members.

7. The vehicle structure according to claim 1, wherein the reinforcement member has a substantially concave surface and a substantially convex surface, and wherein at the substantially convex surface each ridge of the head section has a recess at a location which is central in relation to the first and second legs.

8. The vehicle structure according to claim 7, wherein the recesses are in alignment with one another in the longitudinal direction.

9. The vehicle structure according to claim 1, wherein in a direction transverse to the longitudinal direction the first leg is longer than the second leg in a direction transverse to the longitudinal direction.

10. The vehicle structure according to claim 1, wherein the first leg is substantially flat.

11. The vehicle structure according to claim 1, wherein the second leg is corrugated and comprises corrugations, wherein the corrugations of the second leg comprise ridges and grooves, wherein each ridge of the second leg extends between the foot of the second leg and the head section, and wherein each groove of the second leg extends between the foot of the second leg and the head section.

12. The vehicle structure according to claim 1, wherein each of the first and second members has a first side wall and a second side wall, wherein the first side wall is located on one side of the bottom surface while the second side wall is located on the opposite side of the bottom surface, wherein the first and second walls of the first member and the bottom surface of the compartment of the first member define the compartment of the first member, wherein the first and second walls of the second member and the bottom surface of the compartment of the second member define the compartment of the second member, wherein the first side wall of the first member is attached to the first side wall of the second member, and wherein the second side wall of the first member is attached to the second side wall of the second member.

13. The vehicle structure according to claim 1, wherein each of the first and second members has a first side wall and a second side wall, wherein the first side wall is located on one side of the bottom surface while the second side wall is located on the opposite side of the bottom surface, wherein the first and second walls of the first member and the bottom surface of the compartment of the first member define the compartment of the first member, wherein the first and second walls of the second member and the bottom surface of the compartment of the second member define the compartment of the second member, wherein each of the first and second members has a first flange attached to the first side wall, wherein each of the first and second members has a second flange attached to the second side wall, wherein the first flange of the first member is attached to the first flange of the second member, and wherein the second flange of the first member is attached to the second flange of the second member.

14. The vehicle structure according to claim 12, wherein the head section faces the first side walls.

15. The vehicle structure according to claim 12, wherein the foot of the first leg and the foot of the second leg point substantially toward or face the second side walls.

16. The vehicle structure according to claim 1, wherein the reinforcement member is formed from a plate.

17. The vehicle structure according to claim 1, wherein the reinforcement member comprises or consists of a metal or a metal alloy.

18. The vehicle structure according to claim 1, wherein each of the first and second members is formed from a plate.

19. The vehicle structure according to claim 1, wherein each of the first and second members comprises or consists of a metal or a metal alloy.

20. The vehicle structure according to claim 1, wherein each of the first and second members is one of: a hat profile and a U-profile.

* * * * *